US008701082B2

(12) United States Patent
Gerken

(10) Patent No.: US 8,701,082 B2
(45) Date of Patent: Apr. 15, 2014

(54) METHOD AND APPARATUS FOR GENERATING A MODEL-DRIVEN DEVELOPMENT USER INTERFACE

(75) Inventor: Christopher H. Gerken, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1140 days.

(21) Appl. No.: 12/649,884

(22) Filed: Dec. 30, 2009

(65) Prior Publication Data

US 2011/0161922 A1 Jun. 30, 2011

(51) Int. Cl.
*G06F 9/44* (2006.01)
*G06T 11/20* (2006.01)

(52) U.S. Cl.
USPC .......................................... 717/106; 345/440

(58) Field of Classification Search
None
See application file for complete search history.

(56) References Cited

U.S. PATENT DOCUMENTS

| 7,000,218 | B2 | 2/2006 | Gerken |
| 7,363,578 | B2 | 4/2008 | Bendsen et al. |
| 7,376,933 | B2 | 5/2008 | Gerken et al. |
| 7,617,222 | B2 | 11/2009 | Coulthard et al. |
| 2004/0205550 | A1 | 10/2004 | Gerken |
| 2006/0101385 | A1 | 5/2006 | Gerken et al. |
| 2006/0101386 | A1 | 5/2006 | Gerken et al. |
| 2006/0101387 | A1 | 5/2006 | Gerken et al. |
| 2006/0101393 | A1 | 5/2006 | Gerken et al. |
| 2007/0018986 | A1* | 1/2007 | Hauser .......................... 345/440 |
| 2008/0301626 | A1 | 12/2008 | Sivaram |
| 2009/0150125 | A1 | 6/2009 | Elaasar |
| 2009/0150856 | A1 | 6/2009 | Elaasar et al. |
| 2009/0265682 | A1 | 10/2009 | Limburn et al. |

* cited by examiner

*Primary Examiner* — Hyun Nam
(74) *Attorney, Agent, or Firm* — Schmeiser, Olsen & Watts, LLP

(57) ABSTRACT

Described are a method and apparatus for generating software tools used in model-driven development of software. An input model is provided for a first pattern used to generate an artifact associated with a recurring solution. A set of one or more modifications is defined. The set is to be applied to a schema for the input model in order to produce a user model. The set of modifications is received as input to a second pattern. In response to the received set of modifications, program code is generated for implementing a user interface based on the user model and for performing a model-to-model transformation of information from the user model to the input model.

17 Claims, 4 Drawing Sheets

METHOD AND APPARATUS FOR GENERATING A MODEL-DRIVEN DEVELOPMENT USER INTERFACE

FIELD OF THE INVENTION

The invention relates generally to software development. More specifically, the invention relates to a method and apparatus for generating model-driven development user interfaces.

BACKGROUND

Model-Driven Development (MDD) is an approach to software development that uses a model, historically described in UML (Unified Modeling Language), to visualize a software-based application. Participants in software development, for example, architects, business analysts, programmers, and testers, prize MDD for its ability to provide a high-level visual view of the application through various representations of the model. In addition to providing this high-level view, MDD governs the correct implementation of the application and greatly reduces the time until the application becomes ready to run. MDD tooling (called "transformations") reads in the model for the application and writes out an implementation (e.g. Eclipse-based projects, folders, files).

Historically, MDD tooling has provided a low return on investment (ROI), as the skills needed to build the typical MDD solution, for example, strong programming skills, subject matter expertise, and skills related to DB/UML API (database modeling application program interface), and the time required to build manually the MDD tooling were often more costly than the value of the MDD tooling itself. Consequently, industry has produced methodologies to reduce the time to develop MDD solutions, thereby improving the ROI for MDD tooling. Examples of such methodologies are described in U.S. Pat. No. 7,376,933, titled "System and Method for Creating Application Content using an Open Model. Driven. Architecture, in U.S. Pat. No. 7,000,218, titled "System and Method of Identifying and Tracking Software Pattern Metrics, and in U.S. application Ser. No. 10/904, 105, titled "System and Method for Building an Open Model Driven Architecture Pattern Based on Exemplars", the entirety of which patents and patent application are incorporation by reference herein.

Hereafter, MDD solutions are also referred to as "patterns". As defined herein, a pattern is a solution to a recurring problem in a given context. In general, a pattern is an executable software tool that, when run (typically as a background executable component), generates a set of projects, folders, and files according to a given set of architectures, designs, best practices, and naming conventions. These generated projects, folders, and files are examples of artifacts, that is, tangible byproducts generated by the execution of the pattern. If any of the architectures, designs, best practices, or naming conventions in the set were to be changed, a different pattern is needed to generate the artifacts for that different set. Patterns can also be used to generate other patterns, thereby reducing the time-to-value and, conversely, increasing the ROI for those generated patterns.

Patterns, however, assume the existence of an input model describing the artifacts to be generated, and often the tools required to populate pattern-specific models do not exist and have to be built manually (i.e., user input supplied through an editor). Some of these populating editors can be quite complex and difficult to build. As a result, the overall ROI of such patterns is reduced.

SUMMARY

In one aspect, the invention features a computer-implemented method for generating software tools used in model-driven development of software. An input model is provided for a first pattern used to generate an artifact associated with an implementation of a recurring solution. A set of one or more modifications is defined. The set of modifications is to be applied to a schema for the input model in order to produce therefrom a user model. The set of modifications is received as input to a second pattern. Generated in response to the received set of predefined modifications are program code for implementing a user interface based on the user model and program code for performing a model-to-model transformation of information from the user model to the input model.

In another aspect, the invention features a computer program product for generating software tools used in model-driven software development. The computer program product comprises a computer readable storage medium having computer readable program code embodied therewith. The computer readable program code comprises: computer readable program code configured to provide an input model for a first pattern used to generate an artifact associated with an implementation of a recurring solution; computer readable program code configured to define a set of modifications to be applied to a schema for the input model in order to produce a user model; and computer readable program code configured to receive the set of modifications and to generate, in response to the received set of modifications, computer readable program code for implementing a user interface based on the user model and computer readable program code for performing a model-to-model transformation of information from the user model to the input model.

In another aspect, the invention features an electronics device for generating software tools used in model-driven development of software, the electronics device comprises a processor programmed to: provide an input model for a first pattern used to generate an artifact associated with an implementation of a recurring solution; access a set of one or more modifications to be applied to a schema for the input model in order to produce a user model; submit the set of modifications as input to a second pattern; and generate, in response to the submitted set of modifications, program code for implementing a user interface based on the user model and program code for performing a model-to-model transformation of information from the user model to the input model.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
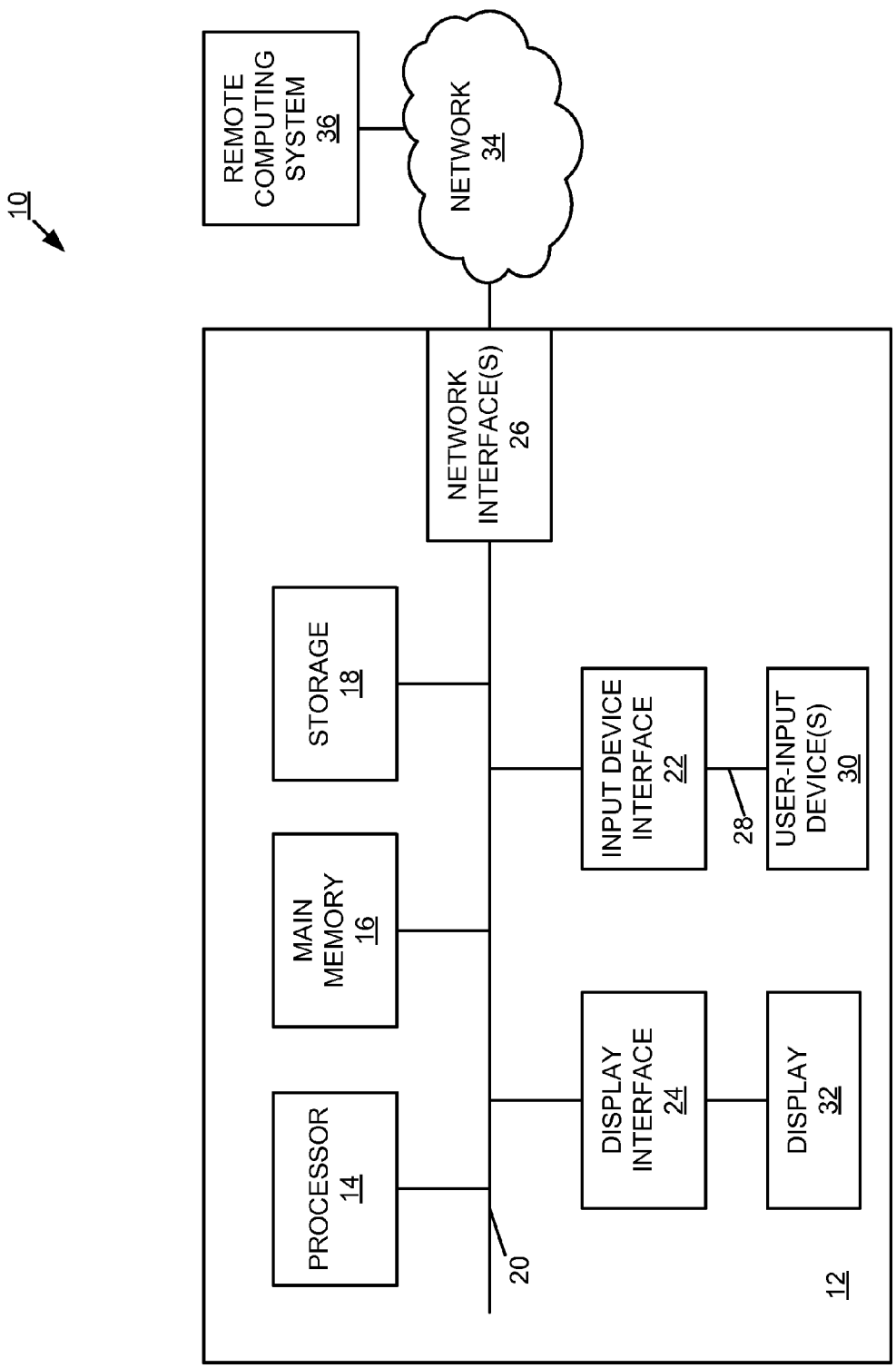
FIG. 1 is a block diagram of an embodiment of an electronics device that can practice the principles of the invention.

In brief overview, embodiments of the invention address (1) that an optimal user model is usually different from its corresponding optimal pattern input model, (2) that the two models carry the same information, but in different structures/schema and with different element and attribute names, and (3) that these differences, after they are captured, can be used to generate not only the user interface, but also the intervening model-to-model transformation that bridges the two models.

When a software developer authors a given pattern, a description of the input model for that pattern is generated at the same time. This input model describes the information needed by the pattern to generate its output (i.e., artifacts associated with a specific implementation of a recurring solution). In general, a model comprises a set of objects, each object having attributes and associations. Examples of models include, but are not limited to Extensible Markup Language (XML) schema, Hypertext Markup Language (HTML) object models, database schemas, and class and object diagrams.

As an oversimplified example, consider a pattern that, when executed, generates a typical last will and testament (Will) for a typical two-parent household with some number of children. The input model defines the type of information that is unique to each particular generation of the Will, such as the names of the testator and beneficiaries and the items to be bequeathed. In addition, the input model defines the appropriate places within a given implementation where the pattern inserts such information.

To generate a user-specific Will, a user submits information (unique to the present implementation) through a user interface (UI). Preferably, the UI prompts the user for the information using terminology suited to a typical user's understanding (i.e., in layman's terms). For example, instead of referring to a testator, the UI can refer to the "person who made the will". A UI produced directly from the input model, however, generally employs terminology tailored to the pattern that uses the supplied information, rather than to the understanding of the user who supplies it. For instance, a UI based on an input model for a pattern generating a Will may prompt the user with legalese that the user may find confusing. Hence, instead of the input model, software developers prefer to use a different model (herein called a user model) upon which to build the UI, a model that enables the construction of a more user-friendly user interface.

The process of producing the user model typically entails making various modifications (or simplifications) to the input model. Such modifications include, but are not limited to, corrections (e.g., in cardinality and terminology or names for various elements and artifacts), simplifications (removing superfluous and/or derived attributes and elements), structure, or any combination thereof. The applicant recognized that such modifications could be recorded (e.g., in a file) and submitted as input to a pattern that automatically generates program code for implementing a UI. In generating the program code for the UI, this UI-generating pattern constructs an underlying user model for the UI by applying the various modifications to the input model. Then, when the user later submits information through the UI, this information populates the user model underlying the UI. Placing this information into the format of the input model (e.g., so that the Will-generating pattern can acquire the information) requires a model-to-model transformation, from the user model to the input model.

The applicant further recognized that the same set of modifications used to produce the user model (and the user interface) could also be used to perform this model-to-model transformation. Since the modifications effectively describe those steps taken to transform the input model into the user model, the reverse of such steps could serve to transform the user model into the input model. Based on these modifications as input, another pattern (or the same UI-generating pattern) builds program code that performs this model-to-model transformation. This program code, in conjunction with the program code for implementing a UI, provide front-end UI tooling to interface the pattern being run to produce a specific implementation of a recurring solution.

FIG. 1 shows an example of a computing environment 10 including an electronics device 12 having a processor 14 (e.g., CPU, microcontroller) in communication with memory 16 and disk storage 18 over a communication bus 20. Example implementations of the electronics device 12 include, but are not limited to, a personal computer (PC), Macintosh computer, workstation, a kiosk, laptop computer, server system, hand-held device, such as a personal digital assistant (PDA) or a cellular phone, and network terminal.

The memory 16 includes non-volatile computer storage media, such as read-only memory (ROM), and volatile computer storage media, such as random-access memory (RAM). Stored in the ROM may be a basic input/output system (BIOS), which contains program code for controlling basic operations of the electronics device 12, including start-up of the electronics device and initialization of hardware. Stored within the RAM are program code and data. Program code includes, but is not limited to, application programs, program modules, plug-ins, and an operating system (e.g., Windows XP, Vista, Windows 7, Linux, and Macintosh). The non-volatile storage 18 may be removable or non-removable storage media, examples of which include, but are not limited to, hard disks, USB memory sticks, optical disks such as CD ROMs, magnetic diskettes, and flash memory cards.

Some application programs on the electronics device 12 provide a user with an integrated development environment (IDE). In general, an IDE is a set of tools, such as a source code editor, compiler, interpreter, and debugger, which assist software developers in their development of application programs. Eclipse, managed by the Eclipse Foundation, is one example of an IDE; it also has a plug-in system for extending the IDE. Another example of an IDE is the IBM Rational Application Developer (RAD) for WebSphere Software, made by the Rational Software division of IBM Corporation of Armonk, N.Y. RAD is an Eclipse-based plug-in, and can support third-party plug-ins for Eclipse. The various patterns described herein can be implemented as plug-ins for an IDE, such as RAD.

The communication bus 20 connects the processor 14 to various other components of the electronics device 12, including a input device interface 22, a display interface 24, and a network interface 26. Although shown as a single bus, the communication bus 20 can comprise multiple separate busses, which may be of different types. Example implementations of the communication bus 20 include, but are not limited to, a Peripheral Component Interconnect (PCI) bus, an Industry Standard Architecture (ISA) bus, an Enhanced Industry Standard Architecture (EISA) bus, and a Video Electronics Standards Association (VESA) bus.

Over one or more links 28 (wire or wireless), the input-device interface 22 is in communication with one or more user-input devices 30, e.g., a keyboard, a mouse, trackball, touch-pad, touch-screen, microphone, joystick, by which a user can enter information and commands into the electronics device 12. A display 32 (e.g., a video monitor) connects to the communication bus 20 through the display interface 24.

The electronics device 12 is connected to a network 34 over which the electronics device 12 can communicate with a remote system 36. Examples of the network 34 include, but are not limited to, local-area networks (LAN), metro-area networks (MAN), and wide-area networks (WAN), such as the Internet or World Wide Web. Examples of remote systems include, but are not limited to, Web servers, e-mail servers, application servers, directory servers, instant messaging/web conferencing servers, routers, and personal computers. The electronics device 12 can connect to the remote system 36 over the network 34 through one of a variety of connections, such as standard telephone lines, digital subscriber line, LAN or WAN links (e.g., T1, T3), broadband connections (Frame Relay, ATM), and wireless connections (e.g., 802.11(a), 802.11(b), 802.11(g)).

Figure 2:
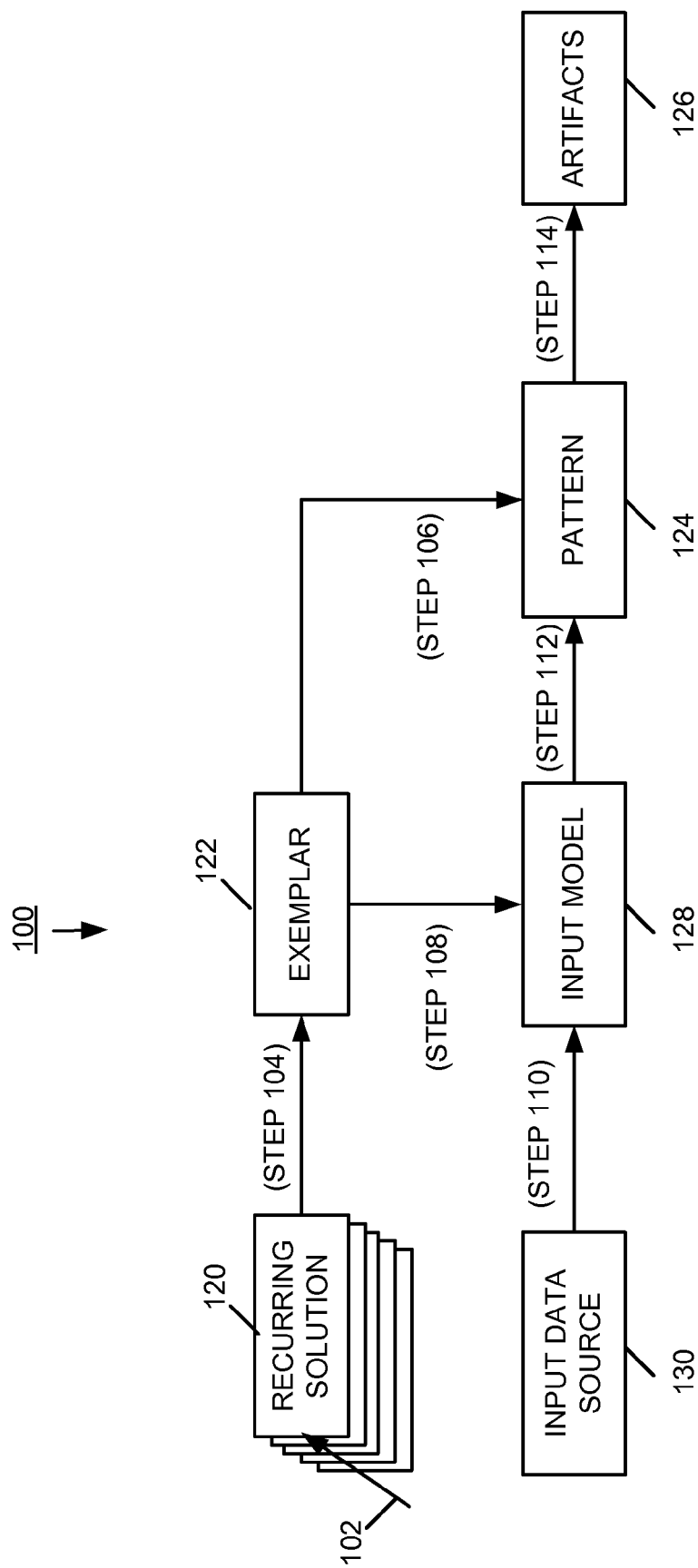
FIG. 2 is a flow diagram of an embodiment of a back-end process for developing software.

FIG. 2 shows an embodiment of a process 100 for automatically generating a model-driven development solution (e.g., an application program). At step 102, a recurring solution 120 stabilizes. In general, this means that the technical developer of the solution has reached a level of understanding for this problem that leads to consistently high quality solutions for the problem in terms of, for example, solution performance, footprint, maintainability and adherence to project, corporate and/or industry conventions. Stabilizing at a solution is precedent to producing a pattern with a reasonable expectation of a return on investment. If a solution has not yet stabilized, any pattern designed to produce that (yet unstable) solution may be used only once or twice before a more-preferred solution arises, rendering the current pattern less valuable.

From a stabilized solution, an exemplar 122 is produced (step 104). The exemplar serves as the archetype after which other similar solutions are patterned. As one example, the exemplar can be a set of files, program code, documentation, etc, associated with an application program. As another example, the exemplar can be the content of a "golden copy" version of a Will.

A pattern 124 is developed (step 106) to produce solutions that imitate the exemplar, given well-defined points of variability expressed in the input model and captured in the pattern implementation. Development of the pattern 124 entails identifying and categorizing artifacts 126, which are any content required by the resulting solution (e.g., a source file required by the application program). Artifacts include, but are not limited to program code, Java™ code and files, HTML files, XML files, property files, admin scripts, text files, C++ files, Adobe™ scripts, C language files, and documentation files.

Also based on the exemplar 122, an input model 128 is generated (step 108) to represent the structure of data to be used by the developed pattern 124. The input model 128 can be expressed in extensible markup language (XML). Other forms of expression can be used to implement the input model 128, such as UML. Methods and systems for constructing a pattern and its input model are described in U.S. patent application Ser. No. 10/904,105, titled "System and Method for Building an Open Model Driven Architecture Pattern based on Exemplars", the entirety of which is incorporated by reference herein.

During operation, an input data source 130 (step 110) supplies data to the input model 128. This input data source 130 can be UI tooling generated as described below. The pattern 124 acquires (step 112) the data from the input model 128 and generates (step 114) the artifacts 126 corresponding to a specific implementation of the stabilized recurring solution. In one embodiment, the pattern 124 is a JET (Java Emitter Template) implementation that transforms the data from the input model 128 into the artifacts 126. Using Rational Software Architect transformations, Eclipse Modeling Framework Technologies (EMFT) JET input can be generated from UML models or any other kind of model.

Figure 3:
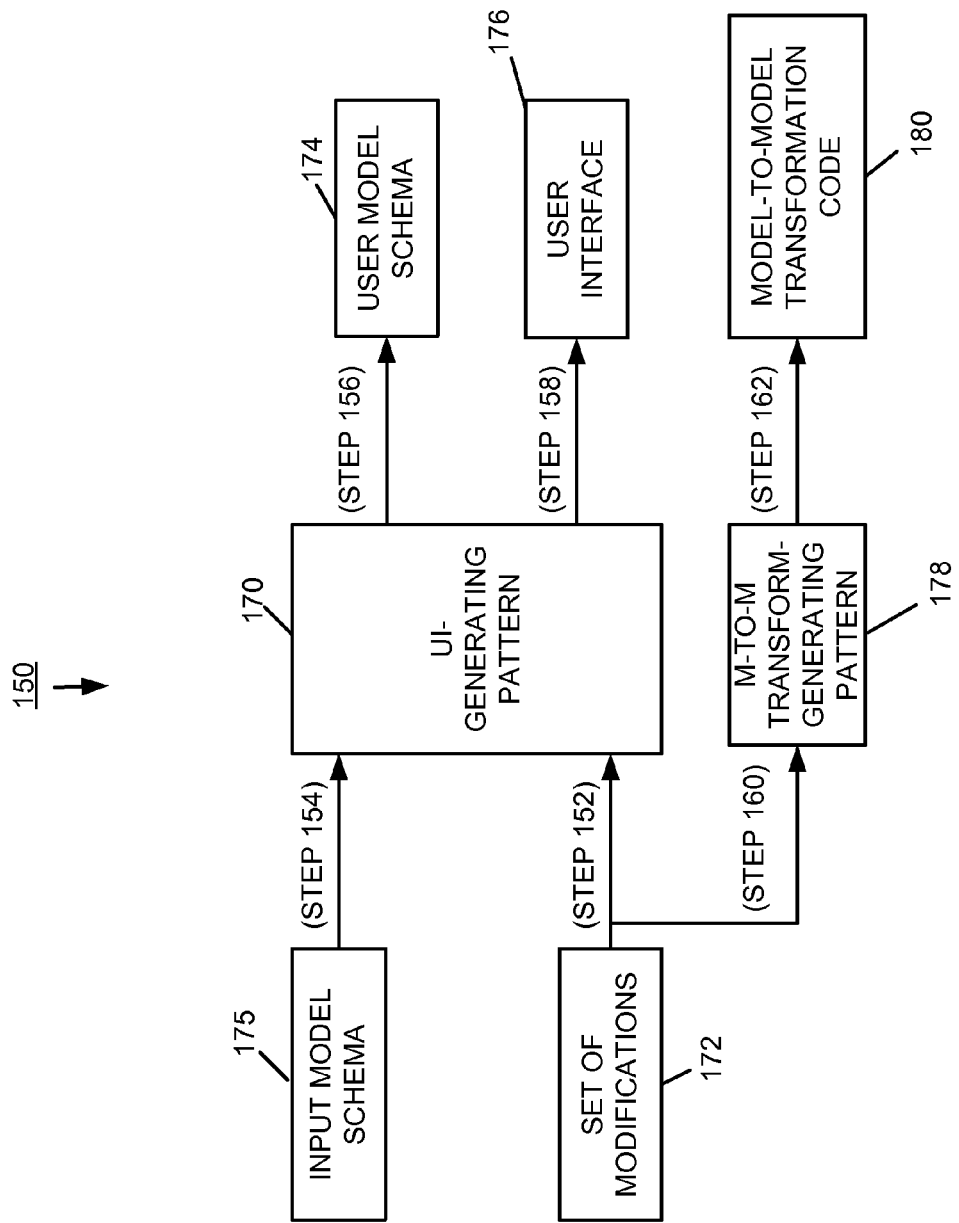
FIG. 3 is a flow diagram of an embodiment of a front-end process for automatically generating an interface through which to supply data to the process for developing software.

FIG. 3 shows an embodiment of a process 150 for automatically generating the UI tooling (e.g., input data source 130 of FIG. 2) for supplying input data to the input model 128. At step 152, a UI-generating pattern 170 receives, as input, a set of predefined modifications 172 to be applied to the schema 175 of the input model 128 in order to produce a new schema 174 for a user model. The UI-generating pattern 170 also receives (step 154) the schema 175 of the input model 128. By applying (step 156) the set of modifications to the input model schema 175, the UI-generating pattern 170 produces a user model schema 174.

An objective of the user model schema 174 is to support the construction of user interfaces that are more "user-friendly" than user interfaces built directly from the input model schema 175. Hence, the types of modifications to be applied generally support this objective. Their selection thus depends upon the specific implementations of user interfaces to be generated by the UI-generating pattern 170 (a design of which can be defined, for example, by a lead software architect).

One type of modification can relate to changing the cardinality of an element defined in the input model schema. For example, the schema of the input model may have multiple instances of a given element, and the lead software architect determines that only one instance of the element is needed in the user model schema (i.e., for most uses of the pattern, for the sake of simplicity of the model). Another type of modification is to change the structure of the schema. For example, a modification can be to add a root attribute to the schema and to remove attributes whose values derive from the root attribute.

Still another type of modification is to establish and ensure compliance to a naming convention for object and java class names. For example, an established naming convention can be to put the letter "I" in front of an object name to produce an interface name and the word "Impl" after the object name to produce the java class name. Instead of a user submitting the names of the interface and java class (and relying on the user to adhere to the established naming convention), the user interface can ask the user to supply the root, and itself construct those names behind the scenes in accordance with the naming convention. In general, these examples of modifications can be deemed simplifications of the input model schema; they are merely examples, other types of modifications can be made to produce a user model schema. These conventions can vary from one project to the next within a large company, and so the flexibility provided by the principles of the invention serves a need to be able to quickly build customized tooling that target the exact conventions in use within a specific project.

Changes can be specified in several ways, each involving an architect who identifies a set of changes to be made to the user model schema in order to arrive at the pattern input model schema. These changes can be stored in a file (e.g., XML) that effectively maps the two model schemas. Each kind of change (cardinality, naming, etc) has certain information that is gathered in order to automate that change. That information is stored as XML. The information could be captured in one of several ways: (1) entered directly into the XML file by hand, (2) using a tool that displays the two schemas and, through user interactions with the tool, driving the tool to write these changes to the file, or (3) a tool displays only the target pattern input model schema and the user indicates the changes to be made with respect to that schema. Either way, the pertinent information can be gathered and persisted in a file, such as an XML file, that is later used to drive the generation of the model-to-model transformation. In effect, each modification serves as a mapping between a user model based on the user model schema and the input model, a mapping that is exploited in the generation of model-to-model transformation code, described in more detail below.

The UI-generating pattern 170 also generates (step 158) a user interface 176 having an underlying user model. Appropriate technology for generating the user interface 176 includes, but is not limited to, Eclipse multi-page editors, Eclipse wizards, Eclipse Graphical Editing Framework (GEF)- and Graphical Modeling Framework (GMF)-based editors, and UML profiles.

Further, the set of specific modifications 172 serves as input (step 160) to a model-to-model transformation-generating pattern 178. Although shown as a separate pattern, the model-to-model transformation-generating pattern 178 can be incorporated within a single pattern with the UI-generating pattern 170. Because each modification provides a transformation from the input model to the user model, the converse provides a transformation from the user model to the input model. Again, the user's view of the modification can be forwards (user model to input model) or backwards (input model to user model), but the pattern model always describes the forward modification from user model to pattern input model. In effect, this is an example of another application of the principles described herein, which are here being applied to the problem of generating model-to-model transformation code.

From the set of modifications 172, the model-to-model transformation-generating pattern determines the converse of the modifications and generates (step 162) model-to-model transformation code 180. This model-to-model transformation code 180 maps data, supplied through the user interface 176, from the user model 174 to the input model 128.

Figure 4:
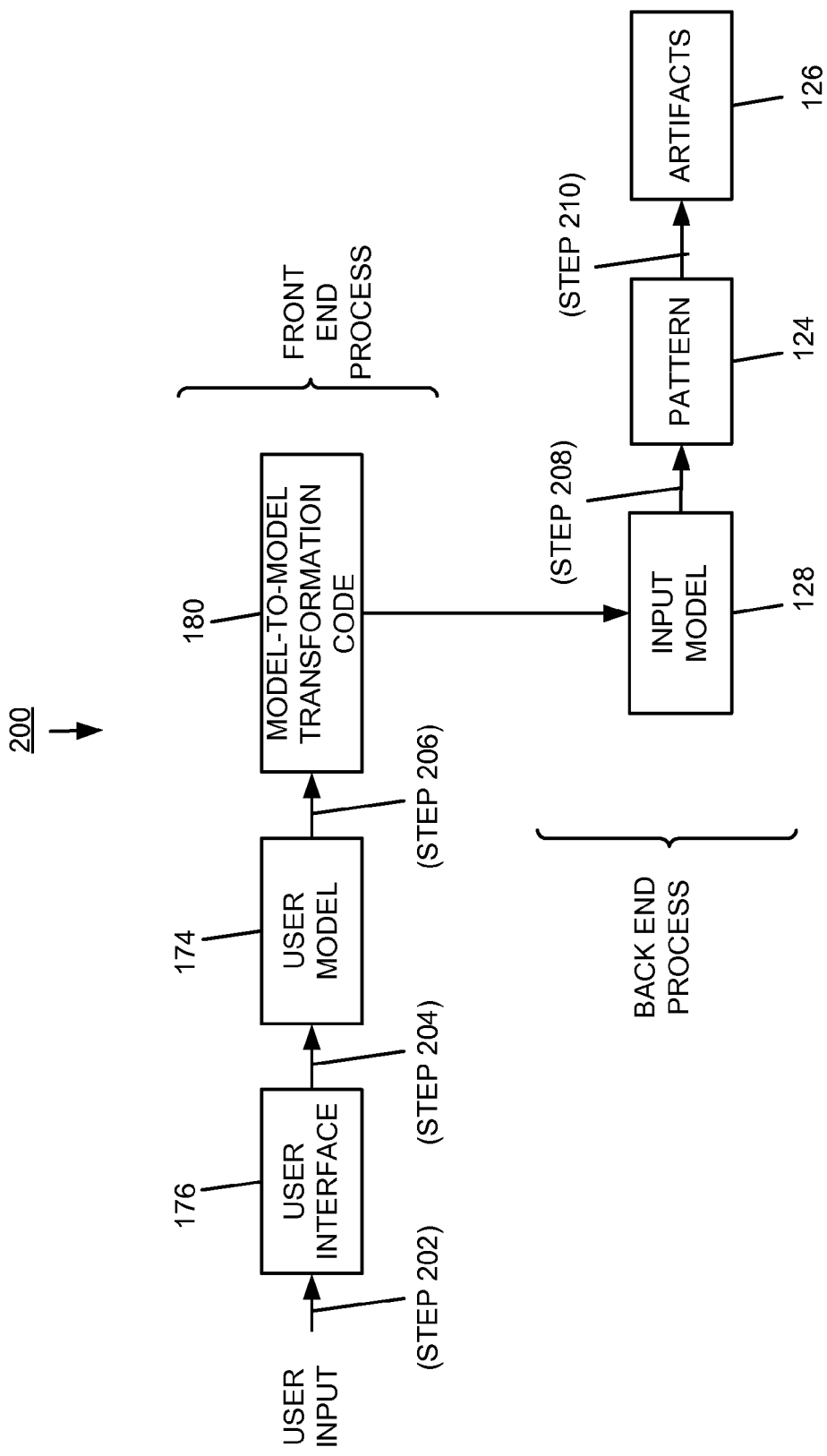
FIG. 4 is a flow diagram of an embodiment of a process in which the front-end process of FIG. 3 and back-end process of FIG. 2 cooperate to produce artifacts related to a specific implementation of a recurring solution.

FIG. 4 shows an embodiment of a process 200 for automated software development using the UI tools (user interface 176 and model-to-model transformation code 180) generated as described in connection with FIG. 3. A software developer runs this UI tooling in conjunction with the input model 128 and pattern 124. (All of such software components can be collocated at the electronics device 12 of FIG. 1.) At step 202, a user runs the user interface 176 and supplies information as requested. The supplied information serves to populate (step 204) the user model underlying the user interface 176. In response to when the user chooses to run the pattern 124 (e.g., by activating a certain button on the user interface), the user interface invokes (step 206) execution of the model-to-model transformation code 180. The model-to-model transformation code 180 performs (step 208) a transformation of information from the user model 174 to the input model 128 in the background (i.e., unbeknownst to the user). After completion of the transformation, the pattern 124 acquires the information from the input model 128 to produce (step 210) the artifacts 126 (e.g., Eclipse artifacts, such as Eclipse projects, folders and files according to a given set of architectures, designs, best practices and naming conventions).

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions, While the invention has been shown and described with reference to specific preferred embodiments, it should be understood by those skilled in the art that various changes in form and detail may be made therein without departing from the spirit and scope of the invention as defined by the following claims.

What is claimed is:

1. A computer-implemented method for generating software tools used in model-driven development of software, the method comprising:
providing an input model for a first pattern used to generate an artifact that is part of an implementation of a recurring solution;
defining a set of one or more modifications to be applied to a schema for the input model in order to produce therefrom a user model;
receiving the set of modifications as input to a second pattern;
generating, in response to the received set of modifications, program code for implementing a user interface based on the user model and program code for performing a model-to-model transformation of information from the user model to the input model;
executing the program code for providing the user interface;
invoking execution of the first pattern through the user interface; and
invoking background execution of the program code for performing the model-to-model transformation, in response to invoking execution of the first pattern.

2. The method of claim 1, wherein generating program code for performing a model-to-model transformation of information from the user model to the input model includes determining a converse for each modification in the set of modifications.

3. The method of claim 1, wherein each pattern is a plug-in to an integrated development environment.

4. The method of claim 3, wherein each pattern is Eclipse-based.

5. The method of claim 1, wherein the first pattern performs a transformation of the input model to produce the artifact.

6. The method of claim 1, wherein the set of modifications includes a change in naming convention.

7. The method of claim 1, wherein the set of modifications are stored in an XML (eXstensible Markup language) file.

8. A computer program product for generating software tools used in model-driven software development, the computer program product comprising:
a non-transitory computer readable storage medium having computer readable program code embodied therewith, the computer readable program code comprising:
computer readable program code configured to provide an input model for a first pattern used to generate an artifact that is part of an implementation of a recurring solution;
computer readable program code configured to define a set of modifications to be applied to a schema for the input model in order to produce a user model;
computer readable program code configured to receive the set of modifications and to generate, in response to the received set of modifications, computer readable program code for implementing a user interface based on the user model and computer readable program code for performing a model-to-model transformation of information from the user model to the input model; and
computer readable program code configured to invoke execution of the first pattern through the user interface; and
computer readable program code configured to invoke background execution of the computer readable program code for performing the model-to-model transformation, in response to invoking execution of the first pattern.

9. The computer program product of claim 8, wherein the computer readable program code configured to generate program code for performing a model-to-model transformation of information from the user model to the input model includes computer readable program code configured to determine a converse for each modification in the set of modifications.

10. The computer program product of claim 8, wherein each pattern is a plug-in to an integrated development environment.

11. The computer program product of claim 10, wherein each pattern is Eclipse-based.

12. The computer program product of claim 8, wherein the first pattern performs a transformation of the input model to produce the artifact.

13. An electronics device for generating software tools used in model-driven development of software, the device comprising a processor programmed to:

provide an input model for a first pattern used to generate an artifact that is part of an implementation of a recurring solution;

access a set of one or more modifications to be applied to a schema for the input model in order to produce a user model;

submit the set of modifications as input to a second pattern;

generate, in response to the submitted set of modifications, program code for implementing a user interface based on the user model and program code for performing a model-to-model transformation of information from the user model to the input model;

execute the program code for implementing the user interface;

invoke execution of the first pattern through the user interface; and invoke background execution of the program code for performing the model-to-model transformation, in response to invoking execution of the first pattern.

14. The electronics device of claim 13, wherein the processor is further programmed to determine a converse for each modification in the set of modifications.

15. The electronics device of claim 13, wherein each pattern is a plug-in to an integrated development environment.

16. The electronics device of claim 15, wherein each pattern is Eclipse-based.

17. The electronics device of claim 13, wherein the first pattern performs a transformation of the input model to produce the artifact.

\* \* \* \* \*